United States Patent [19]

Kaneko et al.

[11] Patent Number: 4,734,793
[45] Date of Patent: Mar. 29, 1988

[54] SYNCHRONIZATION CONTROL SYSTEM IN VIDEO SIGNAL REPRODUCING DEVICE

[75] Inventors: Kiyotaka Kaneko; Katsuo Nakadai; Izumi Miyake; Kazuya Oda, all of Kanagawa, Japan

[73] Assignee: Fuji Photo Film Co., Ltd., Minami, Japan

[21] Appl. No.: 831,912

[22] Filed: Feb. 21, 1986

[30] Foreign Application Priority Data

Feb. 21, 1985 [JP] Japan .................................. 60-34071

[51] Int. Cl.[4] .......................... H04N 5/94; H04N 5/95
[52] U.S. Cl. ..................................... 358/336; 358/338; 358/342
[58] Field of Search ............... 358/314, 322, 327, 335, 358/336, 338, 340, 342; 369/30, 32, 33, 50, 48

[56] References Cited

U.S. PATENT DOCUMENTS

| 4,286,290 | 8/1981 | Pyles et al. | 358/342 |
| 4,387,407 | 6/1983 | Wine | 358/342 |
| 4,409,626 | 10/1983 | Ferguson et al. | 358/336 |
| 4,485,412 | 11/1984 | Sugiyama et al. | 358/342 |
| 4,592,036 | 5/1986 | Furuya et al. | 369/32 |
| 4,609,948 | 9/1986 | Okano | 358/338 |
| 4,613,965 | 9/1986 | Hori et al. | 369/32 |

Primary Examiner—Donald McElheny, Jr.
Attorney, Agent, or Firm—Cushman, Darby & Cushman

[57] ABSTRACT

A video signal reproducing device in which a reproducing video signal is produced and applied to an external display. A servo reference signal is supplied to a servo loop to synchronize the phase of movement of a motor driving a recording medium. During crossing from track to track the video signal is muted and a compound signal synchronized with the servo reference signal applied to the external display.

21 Claims, 3 Drawing Figures

SYNCHRONIZATION CONTROL SYSTEM IN VIDEO SIGNAL REPRODUCING DEVICE

FIELD OF THE INVENTION

This invention relates to a synchronization control system for a video signal reproducing device, and more particularly to a synchronization control system in which, when a reproducing video signal is muted for random access or the like, the reproduced picture is stabilized.

BACKGROUND OF THE INVENTION

In general, a video signal is recorded on the tracks of a recording medium field by field, or frame by frame. In a reproducing device for still video floppies or video disks, a recorder such as a head or stylus is moved in a predetermined direction of the recording medium (for instance, so as to cross the tracks) to skip over to a desired track or to random-access to a location which includes the desired track. In this operation, when the scanning means moves, the reproduced picture becomes irregular. It is unnecessary to reproduce such an irregular picture, and therefore the reproducing video signal is, in general, muted.

FIG. 3 shows a still picture reproducing device which is one example of a conventional video signal reproducing device.

In FIG. 3, a video floppy magnetic disk 1 is rotated by a spindle motor 2 at a predetermined speed, for instance 36 rpm. A plurality of (for instance fifty) concentric tracks are provided on the reverse side of the disk 1, and a video signal for one field is recorded on each track. A magnetic head 3 is provided below the disk 1 in such a manner as to confront the tracks. As the disk 1 rotates, the head 3 scans one selected track (in the case of a dual head, two adjacent tracks being scanned) to output a voltage signal, i.e., an RF signal $S_1$. The RF signal $S_1$ is amplified by an amplifier 4 and supplied to a video signal processing section 5. The video signal processing section 5 conventionally includes an FM demodulator circuit, a deemphasis circuit, a mixer circuit, and a video amplifier circuit, to form a reproducing video signal $S_2$, for instance of NTSC system format. The reproducing video signal $S_2$ is applied through an analog switch 6 to, an output terminal 7, and finally to an RF converter (not shown) to a television set. Alternately, the signal can be applied through the analog switch 6 and the output terminal 7 to a monitor display unit or the like.

The center core 1a of the disk 1 has a PG yoke 1b at a position which leads the position of the leading edge of a vertical synchronizing signal recorded on each track by a phase angle corresponding to 7H (where H is the horizontal scanning period). A PG pickup 8 is disposed above the PG yoke 1b. The PG pickup 8 detects the leakage flux of the PG yoke 1b, to output a PG pulse $S_3$ having a field frequency representative of the rotational phase of the disk 1 (about 60 Hz in the NTSC system for instance). The PG pulse $S_3$, after being amplified by an amplifier 9, is applied to a delay circuit 10, where it is delayed as much as 7H. The PH pulse $S_3'$ thus delayed is applied to a phase comparator 11, where its phase is compared with the phase of a servo reference signal $S_4$ (about 60 Hz) outputted by a servo reference signal generator 12. The servo reference signal generator 12 includes a 3.5 MHz crystal oscillator, and a frequency divider for subjecting the oscillation frequency of the crystal oscillator to 1/59718 frequency division (about 60 Hz being obtained).

A trapezoid wave formed in the phase comparator 11, by utilizing the servo reference signal $S_4$ as gated with the delayed PG pulse $S_3'$. Thus, when the phase of the delayed PG pulse $S_3'$ leads the phase of the servo reference signal $S_4$, a relatively low error voltage $S_5$ is outputted, and when the phase of the delayed PG pulse $S_3'$ lags the phase of the servo reference signal $S_4$, a relatively high error voltage $S_5$ is outputted.

The error voltage $S_5$ is applied to a phase compensating circuit 13 including a phase lagging circuit or phase leading circuit. An error voltage $S_6$ provided at the output terminal of the phase compensating circuit 13 is added to a speed control signal $S_7$ of a speed servo system, and the result of this addition is applied to an amplifier 14.

The speed control signal $S_7$ is formed as follows. A frequency signal FG representing the speed of a spindle motor 2 is obtained from a frequency generator. The frequency signal FG thus obtained is converted into a DC voltage signal V by a frequency-to-voltage converter 16. The DC voltage signal V is applied to a DC filter 17 to form the speed control signal $S_7$. The speed control signal $S_7$ provides a damping effect to suppress any irregular rotation of the spindle motor 2.

The voltage signal ($S_6$–$S_7$) is to the amplifier 14, and after being amplified, is applied as a drive voltage signal $S_8$, to a motor drive amplifier 18. The motor drive amplifier 18 is adapted to perform switching (commutation) and amplifying operations as required, to supply an exciting current I corresponding to the voltage signal $S_5$ to the windings of the spindle motor 2, preferably a DC motor.

A servo loop for synchronizing the rotational phase of the magnetic disk with the servo reference signal $S_4$ is as described above.

The PG pulse $S_3$ is applied to the video signal processing section 5, as described above to form a frame signal in a one-field/one-track recording operation, or to switch an odd-number field signal and an even-number field signal over to each other or to switch a field signal and a field signal obtained by delaying the field signal by 0.5H, or to switch the heads of a dual head assembly.

An envelope detector 19 and a head moving mechanism 20 are controlled by a control section 21 including a microcomputer. The control section 21 is coupled through a line to the analog switch 6 to control the latter.

For random access, an instruction signal $S_5$ for shifting the head 3 from the track Ti which is being scanned to a selected track Tj is applied to the head moving mechanism 20 from the control section 21, while an envelope signal $S_{10}$ representing the envelope of the RF signal $S_1$ is applied to the control section 21 from the envelope detector 19. The position of the head 3 is finely adjusted so that, when the head 3 comes near the track Tj, the level of the envelope signal $S_{10}$ is maximized, and the head 3 is positioned so that it is able to scan the track Tj. In this operation, the head 3 is moved from the track Ti to the track Tj in a radial direction, perpendicular to a circumferential direction of elongation of the track. Therefore, the reproducing video signal $S_2$ outputted by the video signal processing section 5 is irregular during this time.

If this irregular signal $S_2$ is applied to an external picture display unit such as a television set, then the reproduced picture is unacceptable. In order to overcome this difficulty, the control signal $S_{11}$, at logic level "0" (hereinafter referred to merely as "0", when applicable) is applied to the switch 6 by the control section 21, as a result of which the armature of the switch 6 is tripped over to the terminal b. Therefore, the transmission of the reproducing video signal $S_5$ is interrupted during this time of poor video output (i.e., the signal $S_5$ is muted) and the output terminal 7 is grounded. As a result, the picture temporarily disappears from the screen of the television set. At the instant when the head 3 is ready for scanning the track Tj, the control section 21 applies the control signal $S_{11}$ at the logic level "1" (hereinafter referred to merely as "1", when applicable) to the switch, so that the armature of the switch 6 is tripped over to the terminal a. As a result, the reproducing video signal $S_2$ is transmitted to the television set so that the reproduction picture of the track Tj appears on this screen.

SUMMARY OF THE INVENTION

However, the above-described conventional video signal reproducing device suffers from the following drawback. During the aforementioned random access, the internal oscillation frequency (60 Hz) of the synchronizing circuit of the television set, especially that of the vertical deflecting circuit, is pulled out of sync, not being locked by an external vertical synchronizing signal (i.e., the vertical synchronizing signal included in the reproducing video signal). As a result, when the reproducing video signal $S_2$ is transmitted again with the head 3 shifted to the track Tj, the reproduced picture swings horizontally or scrolls vertically until the internal oscillation frequency is pulled in (synchronized) by the vertical synchronizing signal. This phenomenon occurs not only during a random access operation but also in the case when the reproducing video signal is muted for other purposes.

In view of the foregoing, an object of this invention is to eliminate the above-described difficulty accompanying a conventional video signal reproducing device. More specifically, an object of the invention is to provide a synchronization control system for a video signal reproducing device in which, when the reproducing video signal is muted for instance in a random access, the blanking of the oscillation frequency of the synchronizing circuit in an external picture display unit is prevented, whereby the reproduced picture is immediately stabilized.

The foregoing object of the invention has been achieved by the provision of a synchronization control system for a video signal reproducing device with a converter for scanning tracks on a recording medium on which video signals are recorded as predetermined physical patterns, to convert the physical patterns into electrical signals, a drive for causing a relative periodic movement of the recording medium and converter to allow the converter to scan the tracks, means for forming a reproducing video signal by using an electrical signal provided by the conversion means; means for applying the reproducing video signal to a picture display unit externally provided; and a servo loop for synchronizing the phase of the periodic movement with a servo reference signal; in which system, according to the invention, (a) the servo reference signal is synchronized with a compound signal consisting of a horizontal synchronizing signal and a vertical synchronizing signal, and (b) for the period that the reproducing video signal is muted, the compound synchronizing signal is applied to the picture display unit.

As the servo reference signal of the servo loop is syncrhonous with the compound synchronizing signal, the relative synchronous movement of the recording medium and the converter is synchronized with the compound synchronizing signal, and the synchronizing signal included in the reproducing video signal is synchronized with the compound synchronizing signal. Therefore, even when the reproducing video signal is muted, for instance, for a random access, the synchronizing circuit of the picture display unit receives the external synchronizing signal (included in the compound synchronizing signal) which is the same in timing as the previous external synchronizing signal, and therefore the oscillation frequency is not pulled out. When the reproducing video signal is supplied to the picture display unit again after the muting operation, the synchronizing signal included in the reproducing video signal is employed as an external synchronizing signal. The timing of the external synchronizing signal is substantially the same as that of the previous synchronizing signal (included in the compound synchronizing signal), and therefore the oscillation frequency of the synchronizing circuit in the picture display unit is synchronized with the new external synchronizing signal immediately. Accordingly, the reproduced picture is stable (not vibrating nor scrolling).

DESCRIPTION OF THE PREFERRED EMBODIMENT

Figure 2:
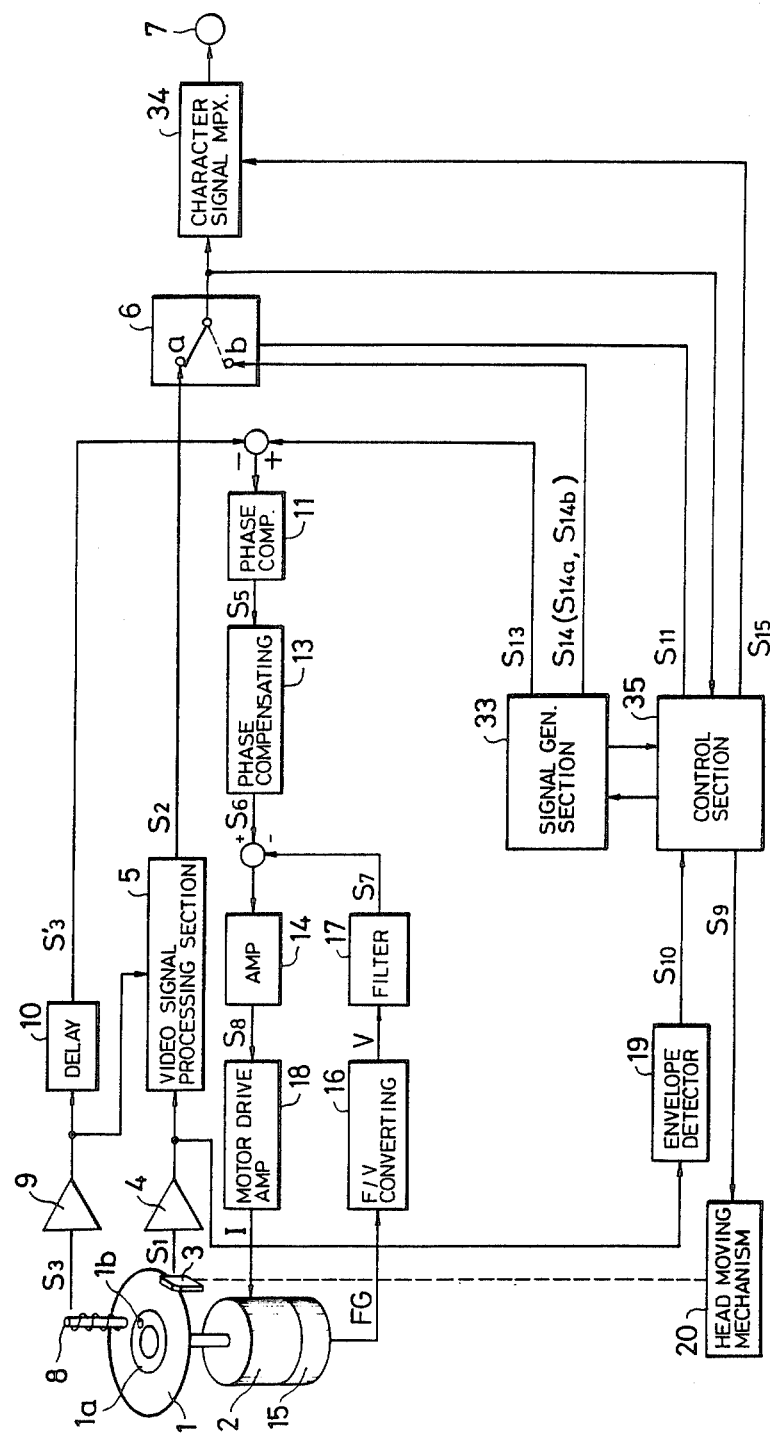
FIG. 2 is a block diagram showing the arrangement of a still picture reproducing device according to a second embodiment of the invention.
Figure 3:
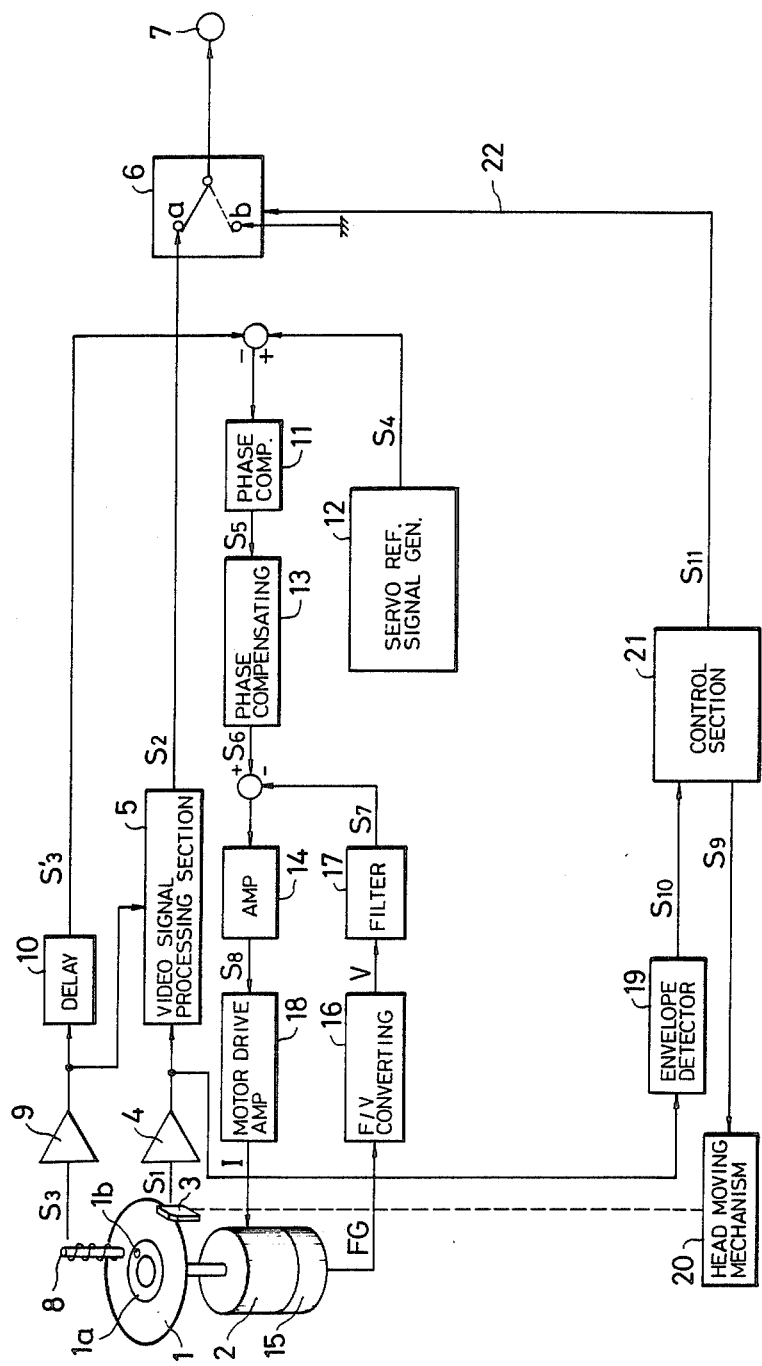
FIG. 3 is a block diagram showing the arrangement of a still picture reproducing device which is one example of a video signal reproducing device according to a conventional synchronization control system.

First and second embodiments of this invention will now be described with reference to FIGS. 1 and 2, respectively, in which those parts or components which have been previously described with reference to FIG. 3 are therefore designated by the same reference numerals or characters.

Figure 1:
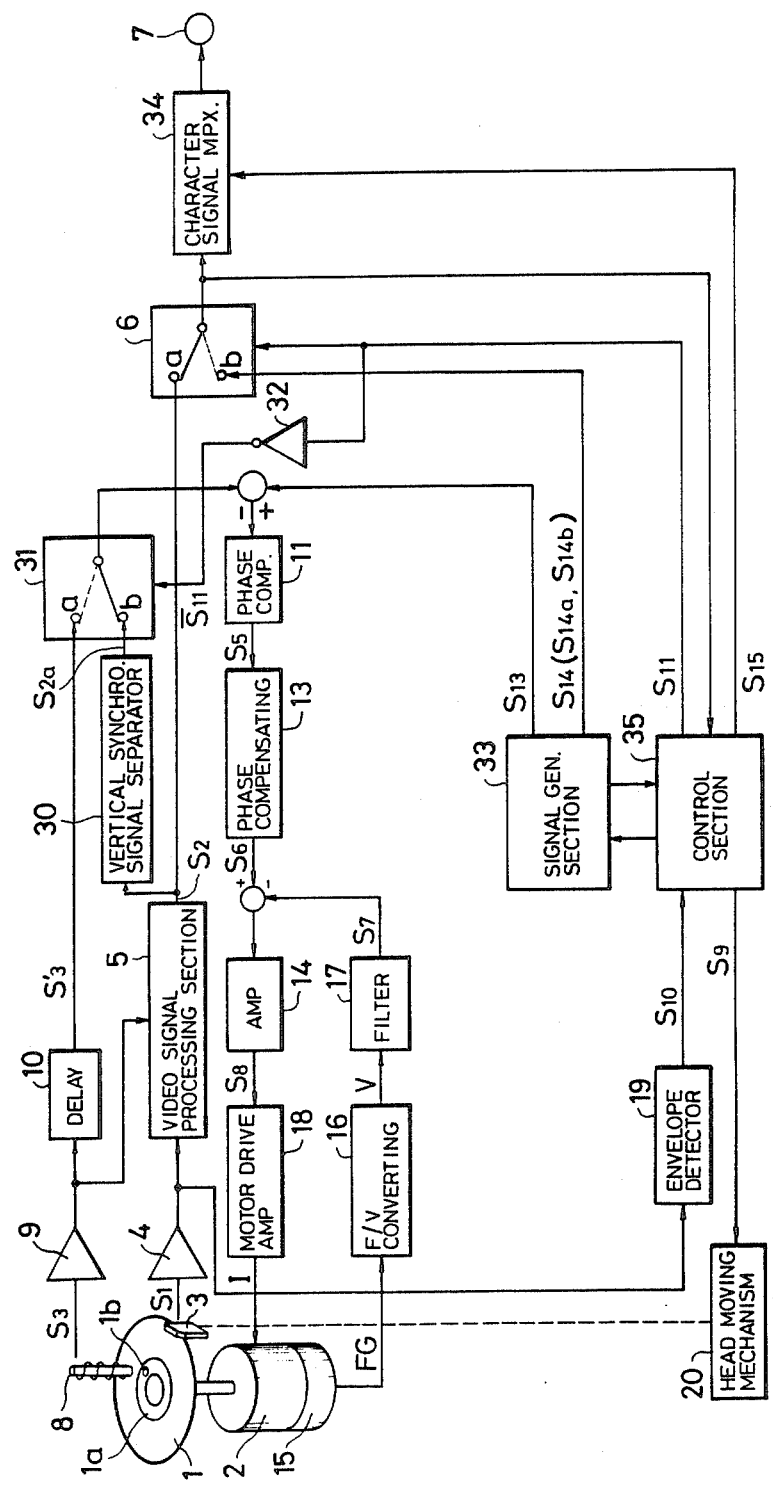
FIG. 1 is a block diagram showing the arrangement of a still picture reproducing device according to a first embodiment of this invention.

As shown in FIG. 1, the reproducing video signal $S_2$ outputted by the video signal processing section 5 is applied to the input terminal a of the analog switch 6 and to a vertical synchronizing signal separator circuit 30. The separator circuit 30 operates to separate a vertical synchronizing signal $S_{2a}$ from the reproducing video signal $S_2$ and to apply it to the input terminal b of an analog switch 31. The input terminal a of the analog switch 31 receives the PG pulse $S_3'$, which is delayed by 7H from the PG pulse $S_3$. A control signal $S_{11}$ outputted by a control section 35 is inverted by an inverter 32 into a control signal $\overline{S_{11}}$ which is applied to the control terminal of the analog switch 31. The output terminal of the analog switch 31 is connected to one input terminal of the phase comparator 11. Therefore, when the switch 31 receives the control signal $\overline{S_{11}}$ having a logic of "1", the armature of the switch 31 is tripped over to the input terminal a so that the delayed PG pulse $S_3'$ is transmitted as a comparison signal to the phase comparator 11. When the control signal $S_{11}$ is applied to the switch 31, the armature is tripped over to the input terminal b so that the vertical synchronizing signal $S_{2a}$ of the reproducing video signal $S_2$ is applied as the comparison signal, to the phase comparator 11. As was described above, the PG pulse $S_3$ is produced when the PG pickup 8 detects the PG yoke 1b. The PG yoke 1b is provided at the position which leads the position of the vertical synchronizing signal recorded on each track by a phase angle corresponding to 7H. Accordingly, theoretically, the PG pulse $S_3$ leads the vertical synchronizing signal $S_{2a}$ of the reproducing video signal $S_2$ by 7H. Pg pulse $S_3'$, delayed by 7H, is therefore theoretically timing to the vertical synchronizing signal $S_{2a}$. However, in practice, there is some time difference between the delayed PG pulse $S_3'$ and the vertical synchronizing signal $S_{2a}$. This time difference occurs because, in the manufacture of the disk 1, the position of the PG yoke 1b or the position of the vertical synchronizing signal of each track may vary.

A servo reference signal $S_{13}$ outputted by a compound synchronizing signal/servo reference signal generating section 33 is applied to the other input terminal of the phase comparator 11. In the phase comparator 11, the trapezoidal wave formed from the servo reference signal $S_{13}$ is gated with one of PG pulse $S_3'$ or the vertical synchronizing signal, depending on the position of switch 31. When the phase of the delayed PG pulse $S_3'$ or the vertical synchronizing signal $S_{2a}$ leads that of the servo reference signal $S_{13}$, the phase comparator 11 outputs a relatively low error voltage $S_5$. When the phase of the delayed PG pulse $S_3'$ or the vertical synchronizing signal $S_{2a}$ lags that of the servo reference signal $S_{13}$, the phase comparator 11 provides a relatively high error voltage $S_5$. The error voltage $S_5$ is applied through the phase compensating circuit 13, the amplifier 14 and the motor drive amplifier 18 to the spindle motor 2 so that the rotational phase of the magnetic disk 1 is synchronized with the servo reference signal $S_{13}$. Similarly to the case of the abovedescribed conventional video signal reproducing device, the frequency generator 15, the frequency-to-voltage converter 16 and the DC filter 17 form the speed control signal $S_7$ which provides a damping action to suppress the irregular rotation of the spindle motor 2.

The servo reference signal $S_{13}$ is synchronous with a vertical synchronizing signal $S_{14a}$, which is part of a compound synchronizing signal $S_{14}$ which is applied to the input terminal b of the switch 6 by the signal generating section 33. The compound synchronizing signal $S_{14}$ may be provided by using a commercially available synchronizing signal generator (SSG) and also includes a horizontal synchronizing signal $S_{14b}$. The servo reference signal $S_{13}$ may be formed by using a monostable multivibrator which is triggered by the vertical synchronizing signal $S_{14a}$. A reset signal and other signals are transmitted between the signal generating section 33 and a control section 35.

The control section 35 includes a microcomputer, and controls the envelope detector 19, the head moving mechanism 20 and the switch 6 in the same manner as the control section 21 shown in FIG. 3. Furthermore, the control section 35 receives the signal (video signal $S_2$ or compound synchronizing signal $S_{14}$) which is provided at the output terminal of the switch 6, and supplies a character signal $S_{15}$ to a character signal multiplex circuit which is connected between the switch 6 and the output terminal 7.

The character signal multiplex circuit 34 multiplexes the video signal $S_2$ from the switch 6 or the character signal $S_{15}$ from the signal generating section 35, and the output of the circuit 34 is applied through the output terminal 7 and the RF converter (not shown) to a television set, or through the output terminal to a monitor display unit.

The operation of the above-described embodiment will be described.

(A) When muting operation is not being carried out, for instance when random access is not effected, a control signal $S_{11}$ of logic value "1" is applied to the switch 6 by the control section 35, so that the armature of the switch 6 is tripped over to the terminal a. As a result, the reproducing video signal $S_2$ outputted by the video signal processing section 5 is applied through the switch 6 to the character signal multiplex circuit 34 and the control section 35. Usually, the reproducing video signal $S_2$ is applied to the output terminal 7 through the character signal multiplex circuit 34 unchanged, and then to the television set, for instance, through an RF converter. However, when required (because of a program), the control section 35 supplies the character signal $S_{15}$ in digital form to the multiplex circuit 34, according to the timing of the vertical blanking period of the reproducing video signal $S_2$ when this signal is being supplied, in the multiplex circuit 34 superposes the character signal $S_{15}$ in a predetermined part of the vertical blanking period of the video signal so as to be transmitted to the television set.

On the other hand, when the control signal $S_{11}$ is at "1", the control signal $\overline{S_{11}}$ is at "0", and therefore the armature of the switch 31 is tripped over to the terminal b. As a result, the vertical synchronizing signal $S_{2a}$ of the reproducing video signal $S_2$ is applied through the switch 31 to the phase comparator 11. Therefore, servo operation is effected so that the rotational phase of the disk 1 becomes synchronous with the servo reference signal $S_{13}$. Control is specifically made so the timing of reading the vertical synchronizing signal from the track which is being scanned at present, and accordingly the timing of generating the vertical synchronizing signal $S_{2a}$ of the reproducing video signal $S_2$, is synchronized with the servo reference signal $S_{13}$, also, the vertical synchronizing signal $S_{2a}$ is separated from the reproducing video signal $S_2$, and the oscillation frequency of the vertical deflecting circuit is locked with the vertical synchronizing signal $S_{2a}$ as an external synchronizing. Thus the picture of the track Tj appears stably on the screen.

(B) When the head 3 moves radially along the disk from the track Ti which is being scanned to the selected track Tj, for instance, during a random access operation, the reproducing video signal $S_2$ becomes irregular. Therefore, the signal $S_2$ must be muted.

In this case, the control section 35 applies the control signal $S_9$ to the head moving mechanism 2, to specify the direction of movement and the amount of movement of the head, and the control signal $S_{11}$ ("0") and the control signal $\overline{S_{11}}$ ("1") respectively to the switches 6 and 31. As a result, the armature of the switches 6 and 31 are tripped over to the terminals b and a, respectively. Therefore, the reproducing video signal $S_2$ from the video signal processing section 5 is interrupted by the switch 6. In its place, the compound synchronizing signal $S_{14}$ (comprised of $S_{14a}$ and $S_{14b}$) from the signal generating section 35 is applied through the switch 6 to the character signal multiplex circuit 34 and the control section 35.

The control section 35 supplies the character signal $S_{15}$ to the multiplex circuit 34 according to the timing of the vertical blanking period of the compound synchronizing. In this operation, the character signal $S_{15}$ may be information which indicates the fact that a random access is being carried out, or a track Tj which is accessed for picture display. In the multiplex circuit 34, the character signal $S_{15}$ is superposed in a predetermined part of the vertical blanking period of the compound synchronizing signal $S_{14}$ so as to be transmitted to the television set. In the television set, the character signal $S_{14}$, the vertical synchronizing signal $S_{14a}$, and the horizontal synchronizing signal $S_{14b}$ are separated from the multiplex signal, and the vertical synchronizing signal $S_{14a}$ is applied, as an external synchronizing signal, to the vertical deflecting circuit. As was described above, since the servo reference signal $S_{13}$ is synchronized with the vertical synchronizing signal $S_{14a}$, and the vertical synchronizing signal $S_{2a}$ of the reproducing video signal $S_2$ is synchronized with the servo reference signal $S_{13}$, the timing of the vertical synchronizing signal $S_{14a}$ is substantially equal to that of the external synchronizing signal ($S_{2a}$). Therefore, the oscillation frequency of the vertical deflecting circuit is maintained locked by this sync signal, as a result of which the picture of the random access information provided by the character signal $S_{15}$ appears quickly on the screen.

On the other hand, when the armature of the switch 31 is tripped over to the terminal a, the delayed PG pulse $S_3'$ is applied, as a comparison signal, to the phase comparator 11. Therefore, in this case, control is so made that the timing of detecting the PG pulse $S_3$ is synchronous with the servo reference signal $S_{13}$ which is delayed about 7H from the PG pulse $S_3$. As was described before, the PG pulse $S_3$ is produced with a leading phase of 7H from the leading edge of the vertical synchronizing signal recorded on each track. Therefore, the timing of the PG pulse $S_3'$ delayed by 7H is substantially the same as that of the comparison signal (the vertical synchronizing signal $S_{2a}$ of the reproducing video signal $S_2$), and even if the PG pulse $S_3'$ is somewhat different in timing from the comparison signal, the former is pulled in by the servo reference signal $S_{13}$. That is, even if the comparison signal is changed from the vertical synchronizing signal $S_{2a}$ of the reproducing video signal to the delayed PG pulse $S_3'$, the rotational phase of the disk 1 is substantially maintained unchanged; i.e., it is maintained synchronous with the servo reference signal $S_{13}$.

(C) When, in the above-described random access, the head 3 comes near the selected track Tj, the envelope signal $S_{10}$ from the envelope detector 19 is received by the control section 35, and the position of the head 3 is finely adjusted so that the level of the signal $S_{10}$ becomes maximized, whereby the head 3 confronts correctly with the track Tj to start the scanning opeation. Thereupon, the control section 35 applies the control signal $\overline{S_{11}}$ ("1") and the control signal $S_{11}$ ("0") to the switches 6 and 31, respectively, so that the armatures of the switches 6 and 31 are tripped over to the terminals a and b, respectively. As a result, the reproducing video signal $S_2$ of the track Tj outputted by the video signal processing section 5 is supplied through the switch 6 to the character signal multiplex circuit 34. The reproducing video signal $S_2$ is further applied to the control section 35, and the latter section 35 supplies the character signal $S_{15}$ to the multiplex circuit 34 when necessary. The multiplex circuit 34 transmits the reproducing video signal to the television set, either unchanged or as a superposition of the character signal on the video signal to form a multiplex signal which is supplied to the television set. In the television set, instead of the vertical synchronizing signal $S_{14a}$ of the compound synchronizing signal $S_{14}$ being used, the vertical synchronizing signal $S_{2a}$ of the reproducing video signal $S_2$ of the track Tj is applied as the external synchronizing signal to the vertical deflecting circuit. The vertical synchronizing signal $S_{2a}$ is produced with a delay of 7H from the PG pulse $S_3$. Theoretically, the signal $S_{2a}$ is synchronous with the servo reference signal $S_{13}$, and even if the former is somewhat deviated from the latter, when the armature of the switch 31 is tripped over to the terminal b, the signal $S_{2a}$ is pulled in by the servo reference signal $S_{13}$. Accordingly, even when the external synchronizing signal is changed from the signal $S_{14a}$ to the signal $S_{2a}$, the oscillation frequency of the vertical deflecting circuit is maintained locked. As a result, the picture of the track Tj appears stable (without vibrating or scrolling) on the screen.

FIG. 2 shows an arrangement of a still picture reproducing device according to a second embodiment of the invention. As is apparent from FIG. 2, the still picture reproducing device of FIG. 2 is substantially similar in arrangement to that of FIG. 1. However, switch 31 in FIG. 1 is not included in the device of FIG. 2 so that the delayed PG pulse $S_3'$ from the delay circuit 10 is always applied as the comparison signal, to the phase comparator 11.

In the above-described first embodiment, the reproducing video signal of each track is applied, as an external synchronizing signal to the picture display unit such as a television set, and is synchronized, as the comparison signal, with the servo reference signal $S_{13}$. Therefore, even if the tracks are erroneously arranged in the circumferential direction, synchronization control can be finely achieved according to the phases of the track. However, if these errors can be accepted (being within 4H), in practice the delayed PG pulse $S_3'$ can be employed as the comparison signal at all times.

The vertical synchronizing signal of the compound synchronizing signal can be used as the servo reference signal, as it is. Furthermore, as is apparent from the above description, the same effect can be obtained in muting operations other than that effected in random access. For instance, when, in a motion picture reproducing device using a disk type recording medium having spiral tracks instead of concentric tracks, the head skips from a track which is being scanned by the head to another track moving radially of the disk, a muting operation is effected in the same manner as that in a random access. Therefore, in this case, the same effect as that of the above-described embodiment can be obtained. The technical concept of this invention is applicable not only to a video signal reproducing device using a magnetic recording disk, but also to a video signal reproducing device using an optical disk, electrostatic capacity type disk or piezoelectric type disk. Furthermore, the technical concept can be applied to a video tape recorder using a magnetic tape.

In this invention, the servo reference signal for the timing (synchronization) of the reproducing operation is synchronized with the compound synchronizing signal, and in a muting operation, for instance, for a random access the compound synchronizing signal is applied to a picture display unit separately provided. Therefore, during the muting operation, the external synchronizing signal is applied to the synchronizing circuit of the picture display unit. Furthermore, as the timing of the external synchronizing signal is maintained unchanged before and after the muting operation, the oscillation frequency of the synchronizing circuit will never pulled out. Therefore, the picture which appears immediately after the muting operation is stable; that is, it will not vibrate nor scroll.

What is claimed is:

1. A video signal reproducing apparatus for use with a magnetic disk of the type that has a phase generate signal generating source at a portion thereof, the position of which having a predetermined relationship in phase with a synchronization of said disk, comprising:
   disk information detecting means, located opposing said disk, for reading information from said disk and producing output signals indicative of: 1) a phase generate signal from said phase generate signal generating source on said disk, and 2) a video signal from said disk;
   drive means for causing relative positional movement between said magnetic disk and said information detecting means, said drive means having a controlling input and producing an output signal indicative of said relative positional movement;
   signal generating means, coupled to an output of said disk information detecting means, for producing a compound synchronization signal comprising a vertical sync signal and a horizontal sync signal synchronized with said video signal, and for producing a servo reference signal, synchronized with at least one of said sync signals in said compound synchronization signal;
   switch means, coupled to receive said video signal and said compound synchronization signal as input signals, and responsive to a control input signal, for selectively outputting one of said input signals based on said control input signal;
   phase detection and correction means, for receiving another synchronization signal from said magnetic disk, and receiving said servo reference signal, and producing an output signal indicative of a difference therebetween, said output signal being used, along with said output signal of said drive means to control said drive means, and wherein said another synchronization signal is said phase generate signal at least during periods of switching between tracks of said disk; and
   control means for commanding a switching between tracks of said disk, and producing and sending a switching signal to said control input of said switch means, said switching signal commanding an output of said composite synchronization signal during said switching of tracks.

2. An apparatus as in claim 1 wherein said disk information detecting means comprises a magnetic head, a phase generating pickup, a video signal processor coupled to said head and said phase generating pickup, and a synchronization signal separator coupled to said video signal processor.

3. An apparatus as in claim 1 wherein said disk information detecting means is also for reading a stored synchronization signal, stored on said disk, from disk and further comprising second switch means, having a first input coupled to receive said stored synchronization signal, and a second input coupled to receive said phase generate signal, an output of said second switch means being coupled to an input of said phase detection and correction means, for, responsive to an input control signal, selectively passing an output corresponding to one of said input signals, and wherein said control means is also for producing said input signal to said second switch means to command said second switch means to pass said stored synchronization signal during normal operation and to pass said phase generate signal during said switching between tracks of said disk.

4. Apparatus as in claim 3 further comprising means for delaying said phase generate signal so that said phase generate signal is substantially synchronized with said reproduced stored synchronization signal.

5. Apparatus as in claim 3 wherein said control means for commanding switching between tracks operation is also for commanding a random access search of said disk.

6. A device as claimed in claim 5, in which said video signal is muted during said random access, and during which said disk information detecting means is moved in such a manner as to cross said tracks on said recording medium to position at a desired track.

7. Apparatus as in claim 1 wherein said phase generate signal is always used for synchronization.

8. Apparatus as in claim 7 further comprising means for delaying said phase generate signal so that said phase generate signal can be used for synchronization.

9. A device as claimed in claim 1, wherein said drive means comprises a spindle motor adapted to rotate said magnetic disk, said disk information detecting means is also for scanning said track while being at rest, and said phase detection and correction means synchronizes the rotational phase of said recording medium with said servo reference signal.

10. A device as claimed in claim 1, wherein a video signal for one field is recorded on each track of said disk, said relative periodic movement has a field frequency of said disk, and said servo reference signal produced by said signal generating means is synchronized with said vertical synchronizing signal of said compound synchronizing signal.

11. A device as claimed in claim 10, further comprising means for applying, for the period that said reproducing video signal is not muted, a vertical synchronizing signal included in said video signal, as a comparison signal to said phase detecting and correcting means.

12. A device as claimed in claim 10, further including pickup means for detecting a reference point, in a circumferential direction, of said disk to apply a pulse signal, as a comparison signal, to said phase detecting and correcting means for the period said video signal is muted.

13. A device as in claim 1 wherein said phase generate signal generating source is a magnetic yoke located at a central portion of said disk at a position related to synchronization of said disk.

14. A video signal reproducing apparatus for use with a magnetic disk of the type that has synchronization signals stored thereon, and has a phase generate signal generating source at a portion thereof, the position of which having a predetermined relationship in phase with at least one of said stored synchronization signals on said disk, comprising:
   disk information detecting means, located opposing said disk, for reading information from said disk and producing output signals indicative of: 1) a phase generate signal from said phase generate signal generating source on said disk, 2) a video signal from said disk, and 3) said stored synchronization signals;

drive means for causing relative positional movement between said magnetic disk and said information detecting means, said drive means having a controlling input and producing an output signal indicative of said relative positional movement;

signal generating means, coupled to an output of said disk information detecting means, for producing a compound synchronization signal, comprising a vertical sync signal and a horizontal sync signal, synchronized with said video signal, and for producing a servo reference signal, synchronized with at least one of said sync signals in said compound synchronization signal;

first switch means, coupled to receive said video signal and said compound synchronization signal as input signals, for selectively outputting one of said input signals responsive to a first control input;

second switch means, coupled to receive said phase generate signal and at least one of said stored synchronization signals as inputs thereof, for selectively outputting one of said input signals as a first sync signal responsive to a second control input;

phase detection and correction means, for receiving said first sync signal from said second switch means, and said servo reference signal and producing an output signal indicative of a difference therebetween, said output signal being used, along with said output signal of said drive means to control said drive means, and control means for: 1) commanding a switching between tracks of said disk operation, 2) producing and sending a signal to said first control input of said first switch means, said signal commanding an output of said composite synchronization signal during said switching of tracks operation, and 3) producing and sending a signal to said second control input of said second switch means, said signal commanding said second switch means to output said phase generate signal at least during periods of said switching between tracks operation.

15. An apparatus as in claim 14 wherein said disk information detecting means comprises a magnetic head, a phase generating pickup, a video signal processor coupled to said head and said phase generating pickup, and a synchronization signal separator coupled to said video signal processor.

16. Apparatus as in claim 14 wherein said control means for commanding switching between tracks operation is also for commanding is a random access search.

17. A device as in claim 14 wherein said phase generate signal generating source is a magnetic yoke located at a central portion of said disk at a position related to said stored synchronization signals of said disk.

18. A video signal reproducing device for use with a magnetic disk of the type that has a phase generate signal generating source at a portion thereof, the position of which having a predetermined relationship in phase with a synchronization of said disk, comprising:

disk information detecting means, located opposing said disk, for reading information from said disk and producing output signals indicative of: 1) a phase generate signal from said phase generate signal generating source on said disk, and 2) a video signal from said disk;

drive means for causing relative positional movement between said magnetic disk and said information detecting means, said drive means having a controlling input and producing an output signal indicative of said relative positional movement;

signal generating means, coupled to an output of said disk information detecting means, for producing a compound synchronization signal comprising a vertical sync signal and a horizontal sync signal synchronized with said video signal, and for producing a servo reference signal, synchronized with at least one of said sync signals in said compound synchronization signal;

switch means, coupled to receive said video signal and said compound synchronization signal as input signals selectively outputting one of said input signals responsive to a control input;

phase detection and correction means, for receiving said phase generate signal and said servo reference signal and producing an output signal indicative of a difference therebetween, said output signal being used, along with said output signal of said drive means to control said drive means, and control means for commanding a switching between tracks of said disk operation, and producing and sending a signal to said control input of said switch means, said signal commanding an output of said composite synchronization signal during said switching of tracks.

19. An apparatus as in claim 18 wherein said disk information detecting means comprises a magnetic head, a phase generating pickup, a video signal processor coupled to said head and said phase generating pickup, and a synchronization signal separator coupled to said video signal processor.

20. Apparatus as in claim 18 wherein said control means for commanding switching between tracks operation is also for commanding is a random access search.

21. A device as in claim 18 wherein said phase generate signal generating source is a magnetic yoke located at a central portion of said disk at a position related to synchronization of said disk.

* * * * *